United States Patent
Wood et al.

(10) Patent No.: US 11,884,559 B2
(45) Date of Patent: Jan. 30, 2024

(54) ELECTROCHEMICAL CELL FOR WASTEWATER TREATMENT WITH IMPROVED ELECTRICAL PROTECTION

(71) Applicant: Axine Water Technologies Inc., Vancouver (CA)

(72) Inventors: Brendan Wood, Vancouver (CA); Julia Lynne Krasovic, Vancouver (CA)

(73) Assignee: Axine Water Technologies Inc., Vancouver (CA)

( * ) Notice: Subject to any disclaimer, the term of this patent is extended or adjusted under 35 U.S.C. 154(b) by 1049 days.

(21) Appl. No.: 16/606,686

(22) PCT Filed: Apr. 19, 2018

(86) PCT No.: PCT/US2018/028401
§ 371 (c)(1),
(2) Date: Oct. 18, 2019

(87) PCT Pub. No.: WO2018/195331
PCT Pub. Date: Oct. 25, 2018

(65) Prior Publication Data
US 2021/0107811 A1    Apr. 15, 2021

Related U.S. Application Data

(60) Provisional application No. 62/487,827, filed on Apr. 20, 2017.

(51) Int. Cl.
*C25B 1/46*    (2006.01)
*C25B 9/00*    (2021.01)
(Continued)

(52) U.S. Cl.
CPC ........ *C02F 1/46104* (2013.01); *C02F 1/4672* (2013.01); *C02F 2001/46142* (2013.01);
(Continued)

(58) Field of Classification Search
CPC ............... C02F 1/46104; C02F 1/4672; C02F 2001/46157; C02F 2001/46142;
(Continued)

(56) References Cited

U.S. PATENT DOCUMENTS

2013/0032491 A1    2/2013    Nitta et al.
2015/0298998 A1    10/2015   Legzdins
(Continued)

FOREIGN PATENT DOCUMENTS

AU    2012241178 A1    5/2014
WO    2017/123969 A1    7/2017

*Primary Examiner* — Zulmariam Mendez
(74) *Attorney, Agent, or Firm* — Seed IP Law Group LLP

(57) ABSTRACT

An electrochemical cell for wastewater treatment comprises a catalyst coated membrane, an open pore mesh placed on each side of the catalyst coated membrane, and a compression frame placed next to each of the open pore meshes. Each compression frame has compression arms spread within the area delimited by the perimeter of the frame to apply a uniform compression force through fasteners which protrude through the compression arms, the open pore meshes and the catalyst coated membrane. Each open pore mesh comprises a flat surface and an embossed surface. The embossed surface can comprise embossed areas around the holes in the open pore mesh, transverse embossed areas which, in the assembled cell, are placed next to the compression arms of the compression frames and peripheral embossed areas along the perimeter of the open pore meshes. The embossed surface provides an improved protection against electro-circuiting.

31 Claims, 9 Drawing Sheets

(51) Int. Cl.
 *C02F 1/461* (2023.01)
 *C02F 1/467* (2023.01)
 *C02F 101/16* (2006.01)

(52) U.S. Cl.
 CPC ............... *C02F 2001/46157* (2013.01); *C02F 2101/16* (2013.01); *C02F 2201/4618* (2013.01); *C02F 2201/46115* (2013.01); *C02F 2201/46195* (2013.01)

(58) Field of Classification Search
 CPC ........ C02F 2101/16; C02F 2201/46115; C02F 2201/4618; C02F 2201/46195; C25B 9/00
 See application file for complete search history.

(56) References Cited

U.S. PATENT DOCUMENTS

2016/0362310 A1 12/2016 Fryda et al.
2016/0362312 A1 12/2016 Cronce et al.

ELECTROCHEMICAL CELL FOR WASTEWATER TREATMENT WITH IMPROVED ELECTRICAL PROTECTION

TECHNICAL FIELD

The present invention relates to an electrochemical cell for wastewater treatment with increased removal rates of pollutants, and in particular it relates to an electrochemical cell for the removal of organic and inorganic pollutants comprising a solid polymer electrolyte membrane and a current collection and cell compression system with improved electrical protection.

BACKGROUND

There is substantial growth in the demand for new wastewater treatment driven by population growth and increased volumes of wastewater produced, tighter wastewater quality regulations, increasing cost of clean water and water shortages, awareness for the protection of clean water sources and replacement of aging wastewater treatment infrastructure. Industries are specifically being forced both by tougher discharge standards and cost pressures to eliminate their recalcitrant wastewater pollutants prior to discharge, and to adopt on-site water reuse and recycling systems to avoid rising water supply and effluent discharge costs. The requirement is for cost-effective, sustainable water treatment systems that do not require the addition of chemicals and do not produce secondary pollution, are compliant with stringent water quality standards, and have minimal operational and maintenance requirements.

Industrial wastewater can contain organic compounds, many of which are toxic, persistent and resist conventional biological and chemical wastewater treatment. The preferred approach to treat recalcitrant wastewater is by non-chemical oxidation techniques that can mineralize the pollutants and reduce the organic load and toxicity of the waste, such as electrochemical oxidation. Electrochemical oxidation is sustainable, safe and has a high treatment efficacy eliminating a wide variety of pollutants such as persistent organic pollutants, dioxins, nitrogen species (e.g. ammonia), pharmaceuticals, pathogens, microorganisms, a majority of priority pollutants and pesticides. Within the area of electrochemical treatment of wastewater there are two primary approaches for the oxidation of pollutants in wastewater. The first method is the direct electrochemical oxidation of organic and/or inorganic pollutants directly on the anode surface. The second method is indirect electrochemical oxidation of organic and/or inorganic pollutants through the in-situ generation of chemically oxidizing species (such as hydroxyl, chlorine, oxygen or perchlorate radicals or compounds such as hypochlorite, ozone, or hydrogen peroxide). These chemically oxidizing species are generated directly on the anode surface and subsequently oxidize pollutants within the wastewater solution.

A variety of cell configurations that include flow-through parallel plates, divided chambers, packed bed electrodes, stacked discs, concentric cylinders, moving bed electrodes and filter-press have been developed for direct and indirect electrochemical wastewater treatment. However, common to all these electrochemical cell configurations is poor operational efficiency and performance leading to high energy consumption and/or low pollutant removal rates.

To increase the performance of electrolytic cells for wastewater treatment published PCT application WO9901382 discloses, for example, adding one or more chemical substances into the fluid to be treated (e.g. an acid, carbon dioxide, an alkali, hydrogen peroxide, or a salt.)

An approach to eliminate the requirement for the addition of a supporting electrolyte is to use a solid polymer electrolyte (SPE) in the electrolytic cell. The SPE technology has been developed for other purposes including for the production of hydrogen by water electrolysis or for generating energy using polymer electrolyte membrane fuel cells.

Generally, an electrochemical cell employing a solid polymer electrolyte (SPE) used for wastewater treatment comprises an anode and a cathode separated by a membrane and two flow field plates for feeding the wastewater to the anode and respectively to the cathode. Such an arrangement is similar with cell designs used in fuel cells and electrolysers. In fuel cells and electrolysis cells, the membrane has to separate the electrolyte flowing on the anode side from the electrolyte flowing on the cathode side. Electrochemical cells used for wastewater treatment are distinguished from fuel cells and electrolysers for hydrogen production in that they do not necessarily require the complete separation of the anode and cathode side. In fuel cells and electrolysers, membrane perforations are avoided to prevent the mixing of the anode and cathode streams and gas leakage between the anode and cathode compartments should be prevented. Another characteristic of the fuel cells and electrolysers, is that gas and liquid tightness of the assembly is required in such cells in order to ensure that the fluid can move through or across the cell's active area without loss of pressure.

One configuration of an electrolytic cell for wastewater treatment using a solid polymer electrolyte (SPE) is described, for example, in applicant's patent publication WO2012167375. The system comprises an electrolytic cell comprising a cathode with a cathode gas diffusion layer and a cathode catalyst layer, an anode with an anode diffusion layer and an anode catalyst layer and a solid polymer membrane electrolyte separating the anode and cathode layers. Wastewater is delivered uniformly to and from anode fluid delivery layer by directing it through the flow field channels provided in an anode flow field plate placed next to the anode fluid delivery layer. The hydrogen gas generated during the electrochemical treatment of wastewater is collected from the cathode and directed out of the electrolytic cell by way of the flow field channels provided in the flow field plate placed next to the cathode fluid delivery layer. The system can comprise multiple electrolytic cells in stacks and in either series and/or parallel arrangements and can operate without catholyte or other supporting electrolyte.

Another approach for treating low conductivity wastewater without the use of supporting electrolytes was disclosed in WO 2005095282/U.S. Pat. No. 7,704,353. This system uses a solid polymer electrolyte sandwiched between anode and cathode electrodes placed in a single chamber of low conductivity wastewater. The electrodes were, for example, expanded metal grids coated with a doped diamond layer and they were clamped in the direction of the polymeric solid electrolyte by bolts placed at the four corner regions of the assembly formed by the electrodes and the polymeric solid electrolyte in between, the bolts projecting through the electrodes and the solid electrolyte at the edges of the cell. In some embodiments, the electrodes were metal plates coated with a doped diamond layer and the polymeric electrolyte was formed in vertical strips which were arranged at a distance from one another and were placed between the electrodes. The system used in this prior art document relies on a relatively low contact-pressure force of the electrodes being exerted on the polymeric solid electrolyte and on the relatively low mechanical stability of the electrodes. The pressure force is exerted by clamping the two electrodes in the direction of the polymeric solid electrolyte by screw bolts positioned at the four corner regions of the assembly. This arrangement presents the disadvantage that the contact between the polymeric solid electrolyte and the electrode cannot be maintained in certain areas, for example in the center of the assembly, which negatively impacts the operating efficiency of this system. Furthermore the solution involving strips of polymeric solid electrolyte material also reduces the system's operating efficiency by providing a reduced electrically conductive area. The energy consumption for pollutant mineralization of this setup was high due to the high voltages required which was indicative of the high resistance losses in this cell assembly, a fact which was not recognized by the applicant.

Another example of an electrochemical cell for treating wastewater from the prior art is disclosed by Goncalves et al. in Electrochimica Acta 121 (2014) 1-14 which describes a SPE (solid polymer electrolyte) filter-press cell employing a $Sb$—$SnO_2$ electrode where the oxide layer is supported on a stainless steel fine mesh substrate. In order to obtain the desired configuration for the SPE cell, a stainless steel mesh was placed between the electrodes (anode and cathode) and perforated current collectors made of stainless steel were used to ensure a uniform distribution of pressure applied on the SPE through springs fixed at the edges of the current collectors. A pressure of 0.5 kgf $cm^{-2}$ was applied by fastening spring loaded screws fixed in the current collectors in order to promote adequate mechanical/electrical contact at the electrode/SPE/water interface. The spring loaded screws were affixed at the edges of the current collectors, surrounding the active area. The disclosure states that "this procedure ensured adequate compression of the SPE, providing the necessary conditions for the zero-gap" and that "this also prevented membrane rupture". The assembly was immersed in water. This prior art document concludes that the use of an SPE filter-press reactor was incapable of preventing electrode deactivation, i.e. the electrodes were deactivated by a progressive reduction in electrical conductivity within the oxide bulk.

The metallic support used in this filter press was stainless steel instead of titanium which might have caused the electrode deactivation and poor performance. Another cause for the poor performance of this cell, which was not recognized by the authors, might be the use of perforated current collectors which, similar to flow fields in fuel cell- or electrolyser-like assemblies, can result in a high level of catalyst deactivation due to the blockage of the catalyst reaction sites under the solid sections of the plates. The filter press presented by Goncalves et al. could not be scaled up to achieve treatment of higher volumes of wastewater because of its compression system which employs spring loaded screws only at the edges of the active area. This was done for the purpose of preventing the membrane rupture. In a scaled up system such a compression system would induce larger gaps between the electrodes in the parts of the active area which are further away from the edges (e.g. in the center of the active area).

The applicant has also developed a system, as disclosed in the International patent publication WO2017123969, where a stack of electrochemical cells are immersed in a reactor tank which contains the wastewater to be treated, wherein each electrochemical cell comprises a solid polymer electrolyte (SPE) membrane and anode and cathode catalyst layers, each catalyst layer being adjacent to one side of the solid polymer electrolyte membrane, and also comprises open pore meshes, each open pore mesh being adjacent to a catalyst layer. The system further comprises compression frames, each frame adjacent to an open pore mesh and having compression arms spread within the area delimited by its perimeter, the compression arms being connected to each other at connection sites. The system further comprises fasteners which protrude through the holes provided in the arms of the compression frames at connection sites, through the holes provided in the open pore meshes and through the catalyst coated membrane to compress the solid polymer electrolyte membrane, the catalyst layers and the open pore meshes between the two compression frames. This system has proven to achieve a higher rate of pollutant removal with a lower operating cost due to the removal of the flow field plates and of the random, heterogeneous porous media (gas diffusion layers). The system provides low voltage operation and energy consumption and can operate at variable effluent flow rates.

In the system described in applicant's pending patent application, the open pore meshes and the compression frames of the electrochemical cell are made of conductive materials for the purpose of current collection. In such systems, any current shorting between the cell components, for example between the two open pore meshes on the two sides of the catalyst coated membrane, has to be prevented.

Notwithstanding the substantial improvements in the system performance of the stack of electrochemical cells described in applicant's pending application, there is still a need to further improve the system by providing a safer protection of the cells against electrical current shorting.

SUMMARY OF THE INVENTION

The present invention describes an electrochemical cell for wastewater treatment comprising a solid polymer electrolyte membrane, an anode catalyst layer adjacent to a first side of the solid polymer electrolyte membrane and a cathode catalyst layer adjacent to a second side of the solid polymer electrolyte membrane, opposite to the first side. The electrochemical cell further comprises a first open pore mesh adjacent to the anode catalyst layer and a second open pore mesh adjacent to the cathode catalyst layer and a first compression frame, adjacent to the first open pore mesh and a second compression frame, adjacent to the second open pore mesh, each of the compression frames having compression arms spread within the area delimited by the perimeter of the frame, the compression arms being connected to each other at connection sites. Fasteners protrude through holes provided in the compression arms of the first and the second compression frames at the connection sites and further through holes provided in the first and second open pore meshes and through the solid polymer electrolyte membrane and the anode and cathode catalyst layers. The fasteners provide the force to compress the solid polymer electrolyte membrane, the catalyst layers and the open pore meshes between the two compression frames. Each open pore mesh comprises a flat surface and an embossed surface which is raised from the flat surface.

The embossed surface of each of the first and second open pore meshes comprises distinct embossed areas, each embossed area surrounding a hole provided in the open pore mesh. The embossed surface of the first and second open pore meshes might further comprise transverse embossed areas, each transverse embossed area connecting two embossed areas which surround holes in the open pore mesh and being placed next to the compression arms of the compression frames in the assembled electrochemical cell. The embossed surface of the first and second open pore meshes might also comprise a peripheral embossed area that is placed at the periphery of each open pore mesh along its perimeter.

Each of the embossed areas of the first and second open pore meshes that surround the holes provided in the open pore mesh, the transverse embossed areas that fit under the compression arms in the assembled electrochemical cell and/or the peripheral embossed area that is placed at the periphery of the open pore mesh along its periphery, comprises a raised flat area and an inclined area which connects the raised flat area of the embossed area to the flat surface of the open pore mesh.

In some embodiments, the electrochemical cell comprises a spacer placed between the embossed area which surrounds a hole in the open pore mesh facing the anode and the anode catalyst layer and/or a spacer placed between the embossed area which surrounds a hole in the open pore mesh facing the cathode and the cathode catalyst layer. The spacers can be made of rubber, for example EPDM (ethylene propylene diene monomer), Buna-N (nitrile rubber) or Viton™.

In preferred embodiments, the solid polymer electrolyte membrane is provided with holes to allow the penetration of fasteners. The holes in the open pore meshes are preferably bigger than the holes in the solid polymer membrane and/or bigger than the holes in the compression arms.

The embossed surface of the open pore meshes is dimensioned based on the elasticity of the material of the open pore mesh, on the compression force applied by the fasteners to the assembly formed by the CCM, by the open pore meshes and by the compression frames and on the thickness of the open pore meshes. The embossed surface of the open pore meshes is dimensioned such that under the compression force applied by the fasteners, the two open pore meshes do not come in contact to each other.

In preferred embodiments, each compression frame of the electrochemical cell comprises a peripheral area on one side of the frame which extends beyond the opposing compression frame of the electrochemical cell and is provided with at least one hole such that when the electrochemical cell is mounted in the slots in the walls of a reactor tank, the wastewater to be treated can flow, through the hole(s), from one side of the electrochemical cell to the other. In the assembled electrochemical cell the peripheral area of one compression frame extends in an opposite direction from the peripheral area of the other compression frame in the cell such that both peripheral areas are fitted in slots provided on opposite walls of the reactor tank.

In some embodiments, each compression frame of an electrochemical cell comprises a peripheral area on each of the two opposing sides of the frame which fit in the slots of a reactor tank and each peripheral area is provided with at least one hole such that when the stack of such electrochemical cells is immersed in a reactor tank the wastewater solution in the tank can flow through the holes provided in the peripheral areas of the compression frames from one side of the electrochemical cell to the opposite side.

In preferred embodiments, the anode and the cathode catalyst layers are each deposited on one side of the solid polymer electrolyte membrane to form a catalyst coated membrane (CCM).

In other embodiments, the anode catalyst layer is deposited on one side of the solid polymer electrolyte membrane and the cathode catalyst layer is deposited on the side of an open pore mesh which faces the opposite side of the membrane. Similarly, in other embodiments, the cathode catalyst layer can be deposited on one side of the solid polymer electrolyte membrane and the anode catalyst layer is deposited on the side of an open pore mesh which faces the opposite side of the membrane. Furthermore, in other embodiments, the anode catalyst layer is deposited on one side of the first open pore mesh and the cathode catalyst layer is deposited on one side of the second open pore mesh, with each side of the open pore meshes which is coated with a catalyst layer facing an opposite side of the membrane.

In preferred embodiments of the present invention, the solid polymer electrolyte membrane has a peripheral portion that extends beyond the catalyst layers and protrudes between the first and the second compression frame to provide the electrical isolation between the two frames.

The fasteners which are used for compressing the assembly formed by the membrane, the catalyst layers and the open pore meshes between the compression frames are made of non-conductive materials.

The compression frames and the open pore meshes of the electrochemical cell of the present invention are made of conductive materials. For example, the compression frames are made of metallic or ceramic materials.

In the electrochemical cell of the present invention the open pore meshes have a porosity that allows easy access of the wastewater to be treated to the catalyst reaction sites and also allow easy removal of the product gases. In preferred embodiments, the open pore meshes have a porosity of between about 30 to about 95%.

In some embodiments, the solid polymer electrolyte membrane is an anion solid polymer electrolyte. In other embodiments, the solid polymer electrolyte membrane is a cation solid polymer electrolyte.

The present invention also refers to a stack of electrochemical cells for wastewater treatment comprising at least one electrochemical cell described here. For some small scale applications the stack can comprise six or less electrochemical cells. Preferably, a stack of electrochemical cells for wastewater treatment comprises 50 electrochemical cells having the architecture described here. Generally, a stack of electrochemical cells for wastewater treatment can comprise up to 500 electrochemical cells.

The electrochemical cells in a stack are connected through at least one rod and are positioned to create a space between two neighboring electrochemical cells, this space allowing the flow of product gases between the cells. For a stack comprising electrochemical cells where each of the compression frames of the electrochemical cells is provided with a peripheral area provided with at least one hole, the electrochemical cell is positioned in the reactor tank by mounting the peripheral areas of the compression frames in slots provided in opposite walls of the reactor tank instead of connecting the cells through rods. The slots are placed at a certain distance from each other and this ensures the adequate spacing between the neighbouring electrochemical cells in the stack to allow the flow of product gases between the electrochemical cells in the stack.

In some embodiments, the stack comprises several electrochemical cells wherein the anode side of one electrochemical cell is facing the anode side of a neighboring electrochemical cell in the stack. In some other embodiments, the anode side of one electrochemical cell in the stack is facing the cathode side of a neighboring electrochemical cell.

The present invention also refers to a system for the treatment of wastewater comprising at least one stack of electrochemical cells immersed in a reactor tank which contains the wastewater to be treated, the electrochemical cells in the stack having the components and the configuration described here. The stacks can be connected either in series or in parallel.

The reactor tank of the present system comprises a lid having gas venting ports through which product gases generated during the stack operation flow to the outside of the reactor tank. Preferably, the reactor tank comprises a level sensor.

A method for wastewater treatment is also described, the method comprising the steps of:
a. providing an electrochemical cell which has the construction described here, the electrochemical cell being immersed in a reactor tank which contains the wastewater to be treated,
b. providing a voltage across the electrochemical cell, and
c. operating the electrochemical cell at a predetermined current density to thereby degrade the pollutant in the wastewater,
wherein the wastewater flows between the compression arms of the compression frames and through the open pore meshes to reach the catalyst layers and to generate the reactions which degrade the pollutant in the wastewater.

In preferred embodiments, the method comprises providing a voltage of about 1.3 to about 10 V across the electrochemical cell. Furthermore, in some embodiments, the method further comprises operating the electrochemical cell at an operating current density of between about 0.05 to about 1.0 A/cm$^2$.

The method of the present invention further comprises taking samples from the wastewater in the reactor tank at predetermined times during the operation of the electrochemical cell and discharging the wastewater to a discharge tank when the samples meet the water purity requirement. The predetermined times for taking the samples from the wastewater in the reactor tank can be determined based on the volume of the wastewater to be treated and on pollutant removal rates which can be determined experimentally.

A method of assembling an electrochemical cell for wastewater treatment is also disclosed and the method comprises the steps of:
a. providing a solid polymer electrolyte membrane, an anode catalyst layer adjacent to a first side of the solid polymer electrolyte membrane and a cathode catalyst layer adjacent to a second side of the solid polymer electrolyte membrane, opposite to the first side;
b. positioning a first open pore mesh adjacent to the anode catalyst layer and a second open pore mesh adjacent to the cathode catalyst layer, wherein each of the first open pore mesh and of the second open pore mesh comprises a flat surface and an embossed surface which is raised from the flat surface;
c. positioning a first compression frame, adjacent to the first open pore mesh and a second compression frame, adjacent to the second open pore mesh, each of the compression frames being made of a conductive material and having compression arms connected to each other at connection sites and being spread within the area delimited by the perimeter of the frame;
d. inserting fasteners through holes provided in the compression arms of the first and second compression frames at the connection sites, through holes provided in the first and second open pore meshes and through the solid polymer electrolyte membrane and the anode and cathode catalyst layers, and
e. compressing the solid polymer membrane, the first open pore mesh, the second open pore mesh, the first compression frame and the second compression frame at the connection sites through a compression force provided by the fasteners,
wherein the connection sites are distributed within the area delimited by the perimeter of the frame to provide a substantially uniform compression force over an area of the electrochemical cell delimited by the compression frames.

BRIEF DESCRIPTION OF THE DRAWINGS

The drawings illustrate specific preferred embodiments of the invention, but should not be considered as restricting the spirit or scope of the invention in any way.

DETAILED DESCRIPTION

Certain terminology is used in the present description and is intended to be interpreted according to the definitions provided below. In addition, terms such as "a" and "comprises" are to be taken as open-ended. Further, all US patent publications and other references cited herein are intended to be incorporated by reference in their entirety.

Herein SPE stands for solid polymer electrolyte and can be any suitable ion conducting ionomer (either of anion or cation, organic or inorganic form), such as Nafion®. A SPE electrochemical cell is thus a cell comprising a SPE as the electrolyte to which electrical energy is supplied to effect a desired electrochemical reaction (with a positive voltage being applied to the anode of the cell).

Herein, unless otherwise specified, when referring to a numerical value the term "about" is intended to be construed as including a range of values within plus or minus 10% of the value being referred to.

Figure 1:
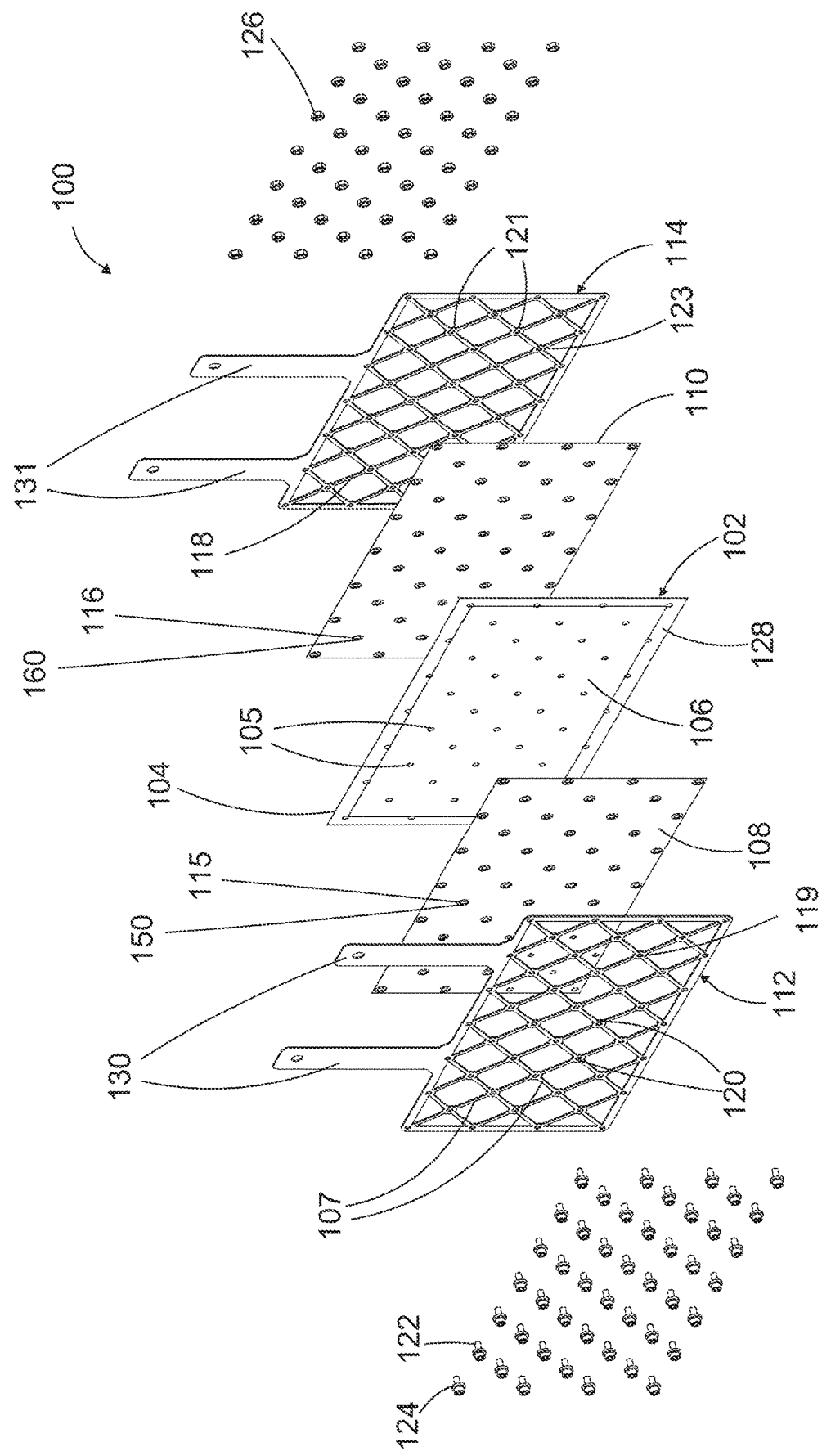
FIG. 1 illustrates an exploded view of an electrochemical cell for wastewater treatment according to the present invention.

An exemplary electrochemical cell for wastewater treatment according to the present invention is illustrated in its exploded view in FIG. 1. Electrochemical cell 100 comprises a catalyst coated membrane 102 (CCM) which consists of a solid polymer electrolyte membrane 104 coated with a catalyst layer 106 on each of its two sides. Only one catalyst layer 106 on a first side of the membrane is shown in FIG. 1, for example this could be the anode catalyst layer, but a person skilled in the art would easily understand that the opposite side of the membrane is also coated with a catalyst layer, which in this example would be the cathode catalyst layer, and which can have substantially the same area as the anode catalyst layer. In this context, in the present disclosure, the anode active area of the electrochemical cell is defined as the area of the membrane (or of the open pore mesh as further described below in alternative embodiments) coated with a catalyst layer on the anode side and the cathode active area is defined as the area of the membrane (or of the open pore mesh) coated with a catalyst layer on the cathode side. In the illustrated embodiment, the solid polymer electrolyte membrane 104 is provided with holes 105 which allow the penetration of fasteners 122 through the membrane during the assembly of the electrochemical cell as further described below. In alternate embodiments, solid polymer electrolyte membrane 104 is not prefabricated with holes and, in this case, the fasteners penetrate the membrane during the assembly process of the electrochemical cell.

Figure 3:
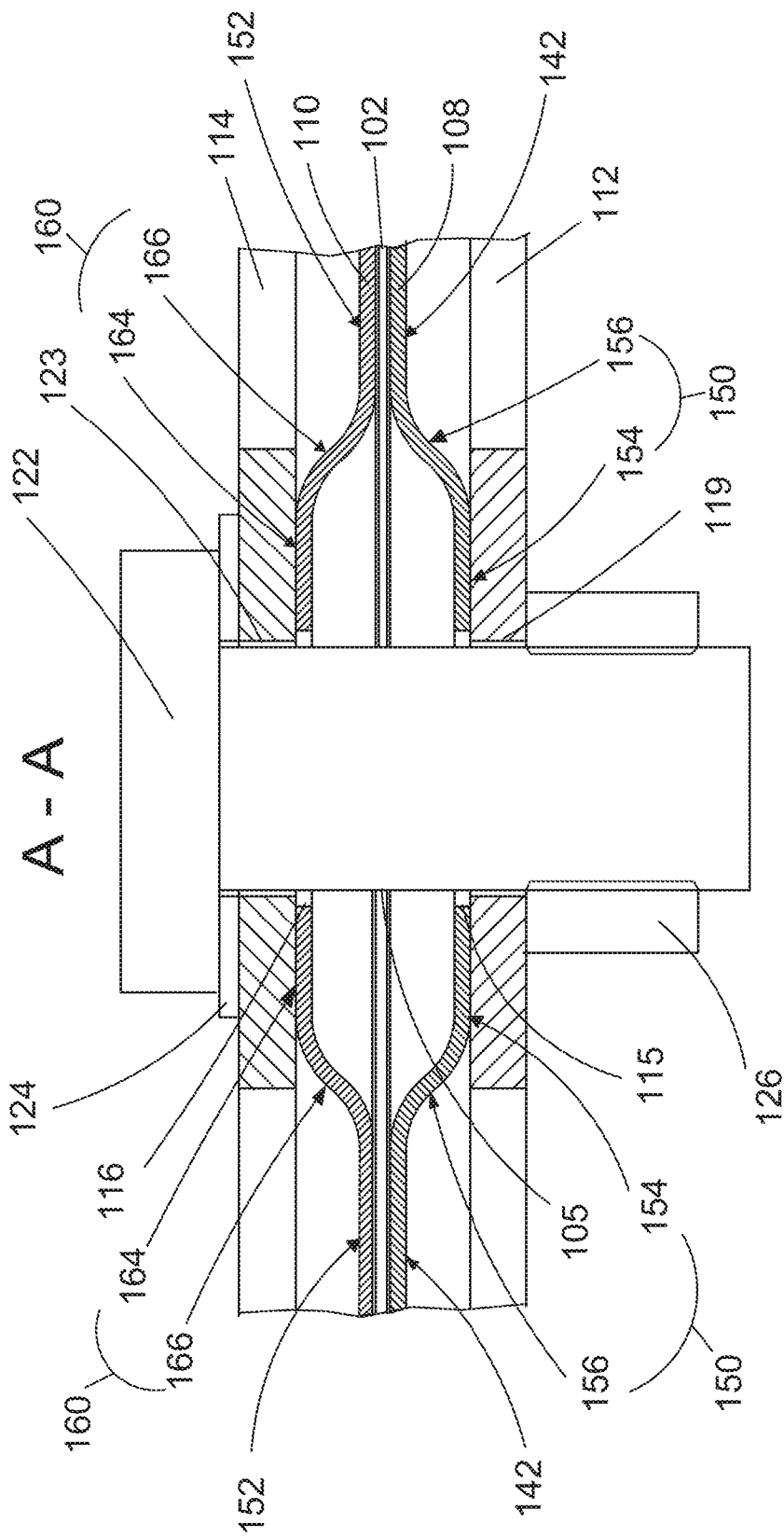
FIG. 3 illustrates a cross-section along line A-A through the electrochemical cell assembly shown in FIG. 2.

The electrochemical cell further comprises open pore meshes 108 and 110, which are placed next to the catalyst coated membrane 102, on each side of the CCM, and compression frames 112 and 114, which are each placed next to the open pore meshes 108 and respectively 110. Open pore meshes 108 and 110 are meshes provided with open pores to allow a relatively large porosity of the mesh, have holes 115 and respectively 116 which allow the penetration of fasteners 122 during the assembly of the electrochemical cell and are provided with embossed areas 150 and respectively 160 around these holes. A more detailed illustration of the open pore meshes 108 and 110, including the distinct embossed areas is represented in FIG. 3 described below. The area of each of the open pore meshes 108 and 110 is substantially the same as the anode and respectively the cathode active area of the electrochemical cell which is the catalyst coated area of the membrane. Area 128 at the periphery of the CCM (102), along its perimeter, is not coated with catalyst and has an electrical isolation function.

Compression frames 112 and 114, which in the illustrated example have the shape of a rectangle with four sides, are each provided with compression arms 107 and respectively 118 connected to each other at connection sites 120, 121 and being spread within the area between the four sides of the compression frame. Holes 119 and respectively 123 are provided in the compression frames at connection sites 120, 121 for allowing the penetration of fasteners 122 during the assembly of the electrochemical cell. The connection sites are distributed within the area between the four sides of each compression frame. Compression frames 112 and 114 are provided with leads 130 and respectively 131 for connecting the cell with the power supply, generally a DC power supply. A person skilled in the art would understand that the compression frames 112 and 114 can have a different shape than the rectangular shape illustrated in the present figures and the compression arms 107, 118 and connection sites 120, 121 are distributed for each compression frame within the area delimited by its perimeter. In the case of a compression frame of a rectangular shape the perimeter of the frame is defined by its sides.

Figure 4:
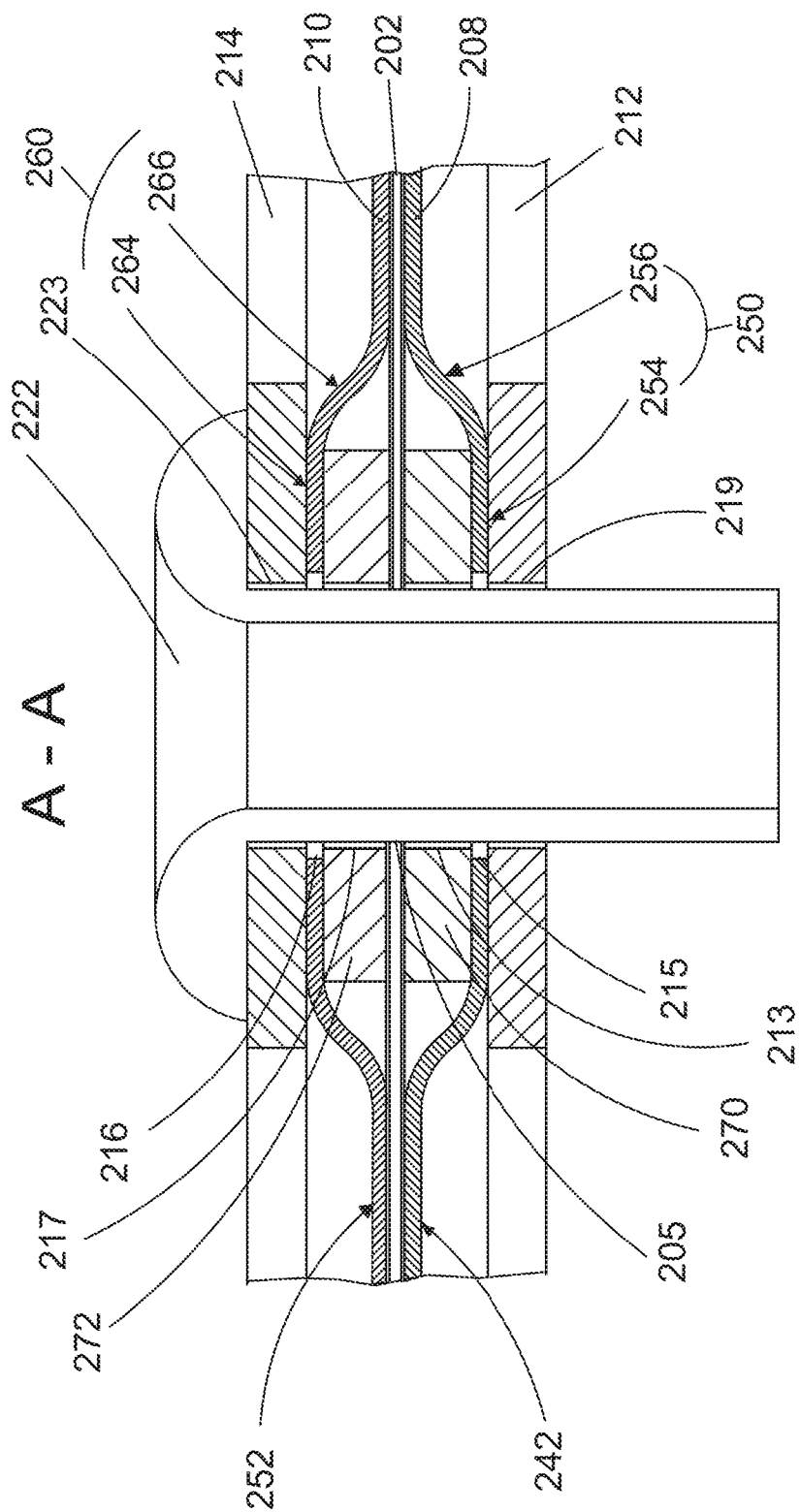
FIG. 4 illustrates a cross-section through another embodiment of the present invention which comprises spacers for supporting the embossed open pore meshes in the proximity of the fastener.

In FIGS. 1, 2, 3, 8 and 9, fasteners 122 are illustrated as threaded bolts which cooperate with nuts 126 to ensure the required compression force, but a person skilled in the art would easily understand that any other fasteners, for example rivets, as illustrated in FIG. 4, can be used for providing the compression force exerted by the compression frames on the open pore meshes and on the CCM and such fasteners might not require any additional elements for ensuring the required compression force.

Open pore meshes 108 and 110 have a relatively high porosity to allow easy access of the polluted water and of treated water to and from the reaction sites on the catalyst layers and easy removal of the gases formed next to the catalyst layer. In the context of the present invention, porosity is defined as the ratio between the open area and the volume of the mesh. Types of meshes that can be used include but are not limited to a sintered titanium fibre mesh supplied by Bekaert having a mesh thickness of between 250 to 550 microns, a fibre diameter of between 22 to 50 microns and a porosity of 50 to 85% and an expanded metal mesh supplied by Dexmet having a mesh thickness of between 10 to 5,000 microns, a strand width of between 0.04 to 0.055 inches with a porosity of between 30 and 95%, with about 33 to 493 openings per square inch and with diamond shaped openings having dimensions of between 0.075 to 0.289 inches for LWD (long way of diamond) and between 0.032 to 0.2 inches for SWD (short way of diamond), where the LWD and SWD are the dimensions of the diagonals of the diamond shaped openings, as explained, for example, on the supplier's website. Preferably open pore meshes are made of conductive metals or ceramics having a thickness of between 10 to 5,000 microns and a porosity of between about 30 to 95%.

The electrochemical cell is assembled together by compressing the CCM 102 between the open pore meshes 108 and 110 and between compression frames 112 and 114, using fasteners 122 which pass through holes 119, 123 provided in compression arms 107, 118 at connection sites 120, 121, through holes 115, 116 provided in the open pore meshes 108 and 110, through the catalyst layers 106 and through holes 105 provided in the solid polymer electrolyte membrane 104. When solid polymer electrolyte membrane 104 does not comprise any holes, fasteners 122 can penetrate directly through the membrane when the electrochemical cell is assembled. Fasteners 122 can be provided with washers 124 which spread the compression force from the fasteners to compression arms 107 or alternatively can have a shape that allows the spreading of the compression force.

Fasteners 122, washers 124 and nuts 126 are made of non-conductive materials. In the electrochemical cell of the present invention fasteners 122 penetrate through the connection sites distributed over the entire area of the compression frames, through the open pore meshes and through the CCM to ensure a substantially uniform distribution of the compression force across the entire active areas of the electrochemical cell and to maintain a reduced gap between the electrodes. This is different than the compression systems described in the existing prior art where the compression of the electrochemical cell is achieved only by the peripheral compression of frames through spring loaded bolts placed at the periphery of the cell to avoid the penetration of any compression means through the SPE membrane.

Figure 5:
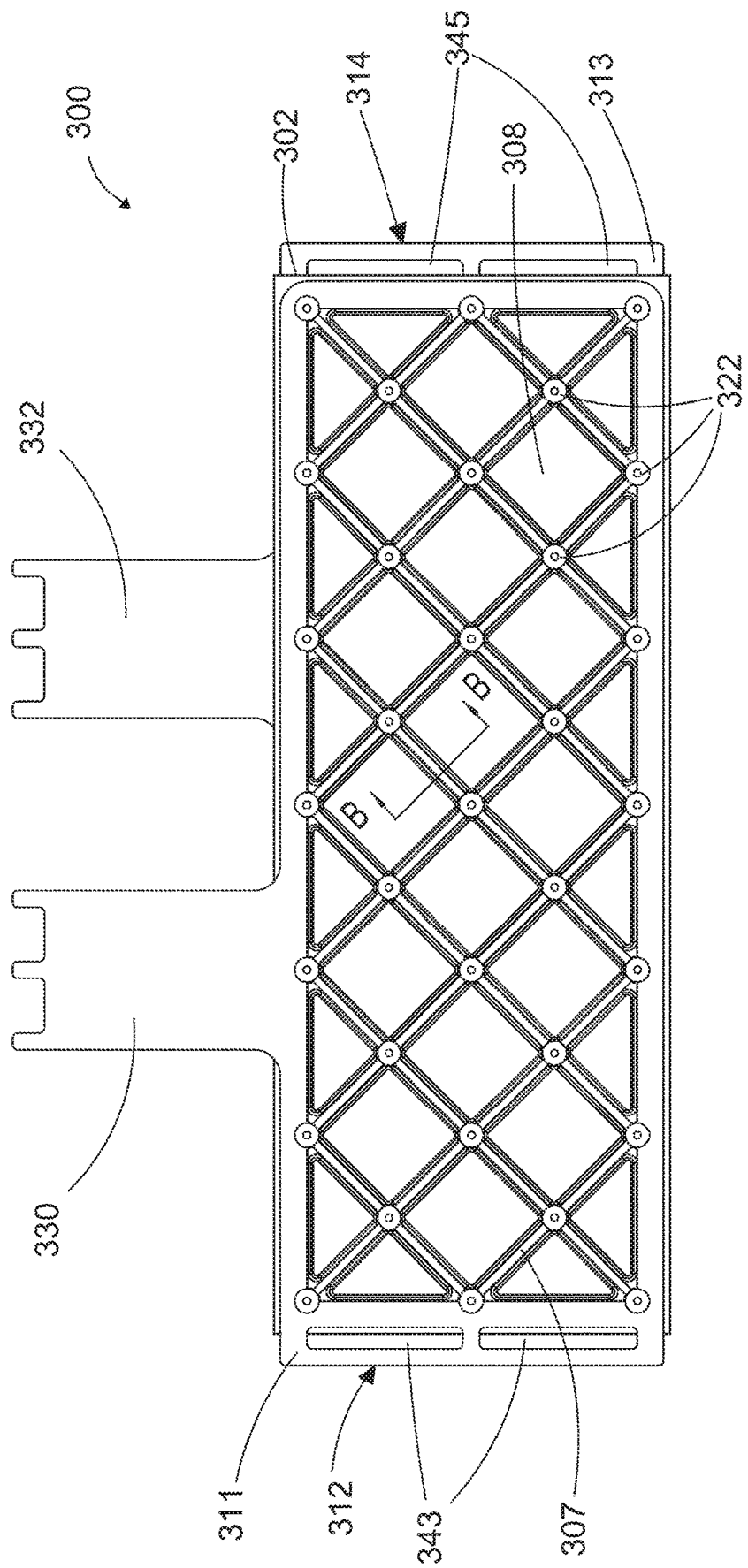
FIG. 5 shows another embodiment of the electrochemical cell of the present invention comprising an embossed open pore mesh having embossed areas around the holes, transverse embossed areas and a peripheral embossed area and compression frames having only one current conducting lead.

The SPE membrane 104 provides a reduced gap between the electrodes (the catalyst layers on the anode and cathode side of the membrane) due to the present compression system. The illustrated electrochemical cell does not comprise any gas diffusion layers to support the catalyst layers and the electrodes comprise only the anode and the cathode catalyst layers 106, each deposited, in this embodiment, on one side of the membrane, which also contributes to a lower operating cost. In other embodiments, each of the catalyst layers can be deposited on one side of the open pore mesh 108 and respectively 110, more specifically on the side of the open pore mesh which is facing the membrane 104. Open pore meshes 108 and 110 provide the local current collection. Compression frames 112 and 114 allow the perimeter current collection for open pore meshes 108 and 110 and their compression arms 107, 118 achieve a substantially uniform compression of the open pore meshes, of the membrane and of the catalyst layers across the entire anode active area and respectively cathode active area mainly due to the distribution of the compression arms and respectively of the connection sites. Compression frames 112 and 114 are made of conductive metals or ceramics with a thickness of 0.5 to 5 mm, for example. A person skilled in the art would understand that the number of connection sites and the aspect ratio of the compression frames can vary and can be configured to allow a substantially uniform compression of the open pore meshes and of the CCM and to accommodate different sizes of commercially available solid polymer membranes. For example, FIG. 5 shows a different aspect ratio of the rectangular compression frames than the one of the compression frames illustrated in FIGS. 1, 2, 8 and 9, and a different distribution of the connection sites.

Figure 2:
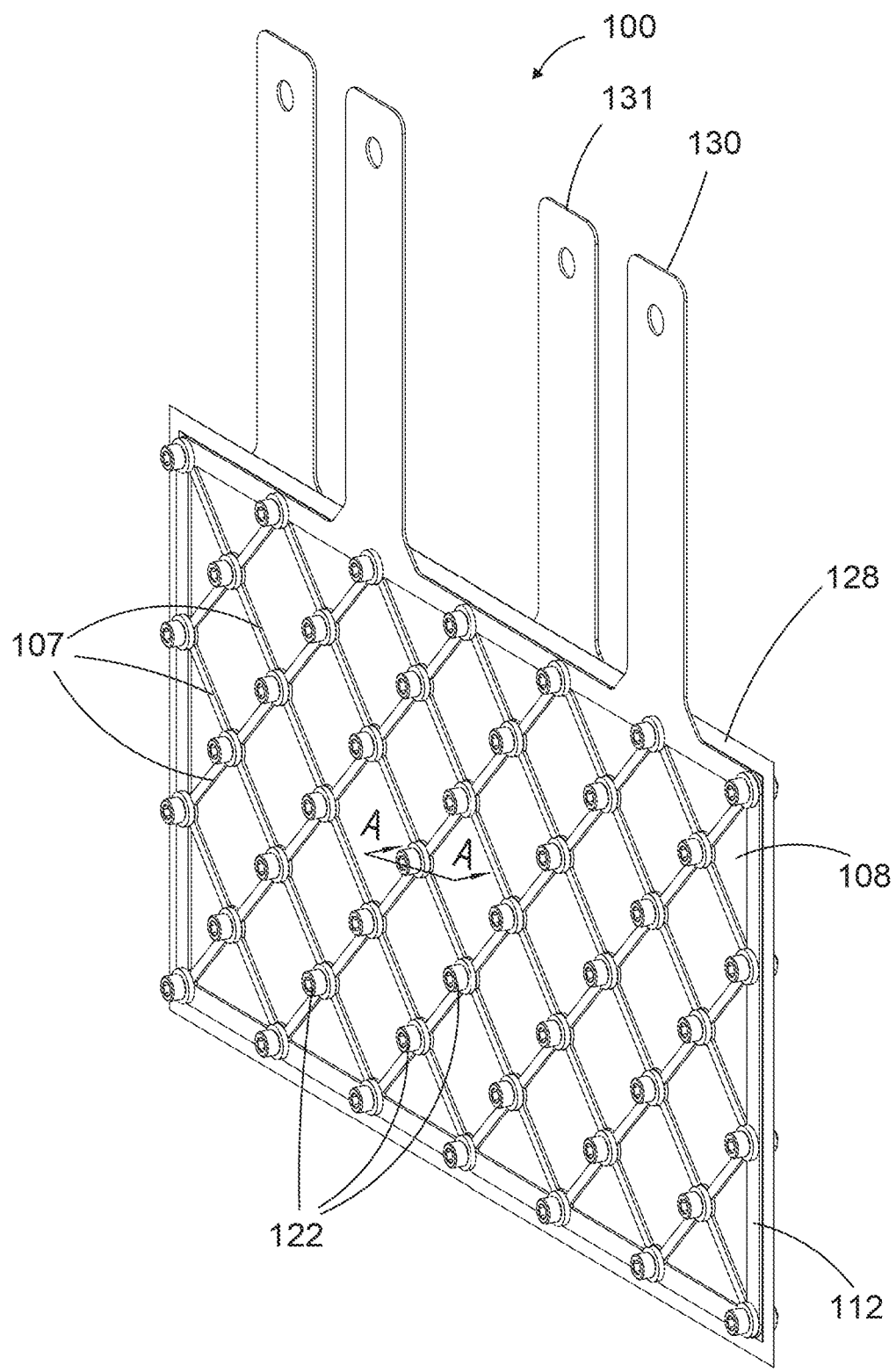
FIG. 2 shows a schematic of an electrochemical cell in its assembled state, where the cell components are compressed between two compression frames and assembled together using threaded bolts and nuts.

The electrochemical cell of FIG. 1 is shown in its assembled state in FIG. 2. Area 128 of the solid polymer electrolyte membrane, which is not coated with catalyst, protrudes between the compression frames and thereby the membrane provides for the electrical isolation between the compression frames.

A cross-section A-A through the electrochemical cell assembly from FIG. 2 is illustrated in FIG. 3. The catalyst coated membrane (CCM) 102 is positioned between open pore meshes 108 and 110. A fastener 122 protrudes through holes 119, 123 in the compression frames 112 and 114, through holes 115, 116 in open pore meshes 108 and 110 and through hole 105 in the CCM 102 and, in cooperation with a nut 126, ensures the compression of the entire assembly.

The embossed area 150 of the open pore mesh 108 and the embossed area 160 of the open pore mesh 110, comprise a raised flat area 154 and respectively 164 and an inclined area 156 and respectively 166 which connects the raised flat area 154 and respectively 164 with the flat surface 142 and respectively 152 of the open pore meshes. The raised flat areas 154 and 164 of the open pore meshes are provided with holes 115, 116. The absolute and relative dimensions of the raised flat area and of the inclined area of the embossed areas 150 and 160 can be calculated based on the elasticity of the material of the open pore meshes and also on the compression force applied by the fasteners to the assembly while taking in consideration the thickness of the open pore mesh. In any case, the dimensions of the embossed areas should be calculated based on the compression force applied by the fastener and the elasticity of the material of the open pore meshes, such that the open pore mesh on one side of the CCM does not protrude through the space between the CCM and the fastener and it does not touch the open pore mesh on the opposite side of the CCM.

Figure 7:
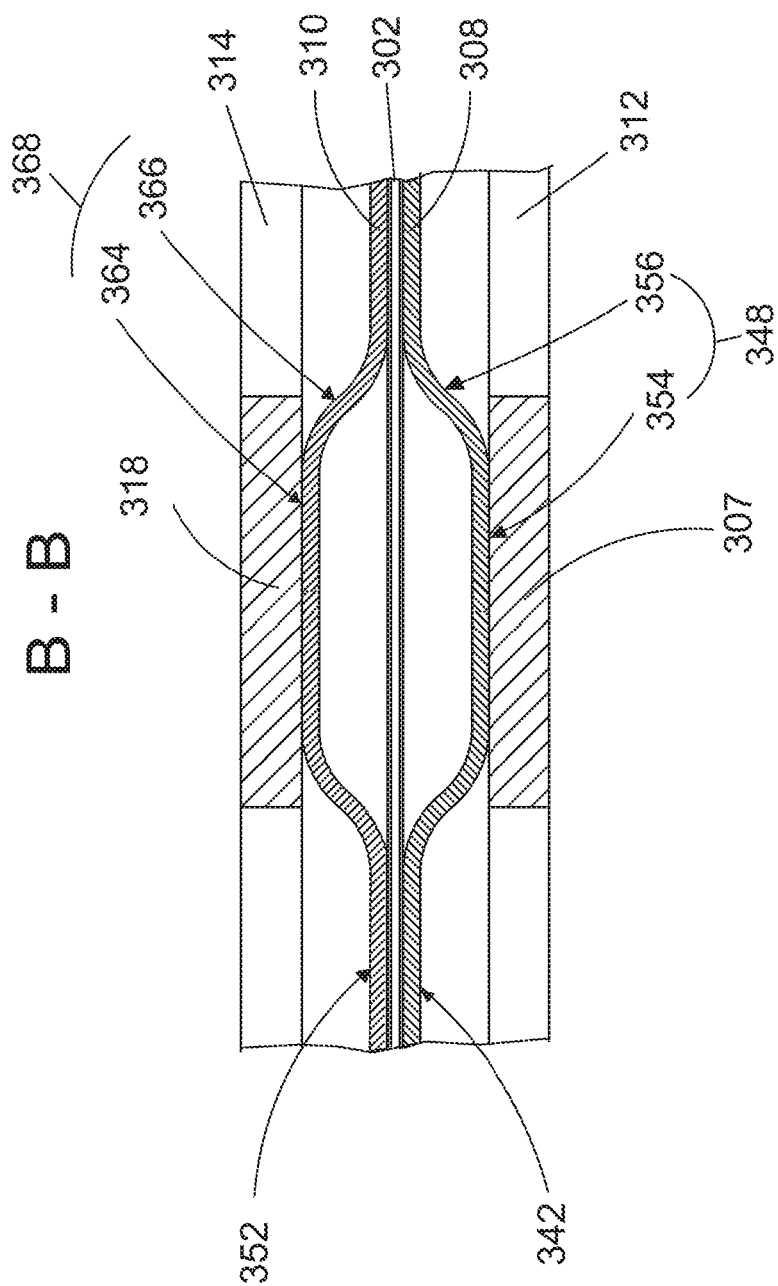
FIG. 7 illustrates a cross-section along line B-B through the electrochemical cell illustrated in FIG. 5.

As seen in FIG. 3, because the embossed areas 150 and 160 of the open pore meshes 108 and respectively 110 are raised from flat surfaces 142 and 152, open pore meshes 108 and 110 do not come close to CCM 102 and are separated from each other by a certain distance in the areas surrounding the fastener 122. This prevents the electrical short-circuiting that can happen if the ends of the two open pore meshes come in contact or close to the CCM or they come in contact to each other through hole 105 provided in the CCM. A person skilled in the art would easily understand that FIGS. 3, 4 and 7 show the electrochemical cell in its assembled state with the required compression force applied by the fastener to the assembly formed by the CCM, open pore meshes and compression frames.

FIG. 4 illustrates a cross-section A-A through another embodiment of an electrochemical cell comprising the embossed open pore meshes of the present invention. This embodiment illustrates an electrochemical cell comprising the same components as illustrated in FIG. 3, having similar reference numbers. The electrochemical cell comprises a CCM 202 placed between two open pore meshes 208 and 210 and between two compression frames 212 and 214. A fastener 222 ensures the compression of the components of the electrochemical cells. In this embodiment, fastener 222 is a rivet and therefore no other component is required for ensuring the compression of the electrochemical cell. Similar to the embodiment illustrated in FIG. 3, each open pore mesh comprises a flat surface 242 and respectively 252 and embossed areas 250 and respectively 260 which each comprise a raised flat area 254 and respectively 264, and an inclined area 256 and respectively 266, which each connect the flat surface of an open pore mesh to the raised flat area. The embodiment illustrated in FIG. 4 further comprises a spacer 270, placed between the open pore mesh 208 and the CCM 202 and a spacer 272 placed on the opposite side of the CCM, between the other open pore mesh 210 and the CCM 202. Spacers 270 and 272 keep the open pore meshes at a distance from the CCM and therefore prevent the accidental contact between the two open pore meshes when a compression force is applied to the assembly. This is especially useful when the open pore meshes are made of thin and/or very flexible materials. Spacers 270 and 272 are made of rubber, for example, EPDM (ethylene propylene diene monomer), Buna-N (nitrile rubber) or Viton™. Fastener 222 protrudes through holes 215, 216 in the open pore meshes 208 and 210, through holes 213 and 217 in the spacers 270 and 272, through hole 205 in the CCM and through holes 219, 223 in the compression frames 212 and 214 and ensures the compression of the electrochemical cell in its assembled state.

In all the embodiments of the present invention the holes in the open pore meshes are illustrated as being bigger than the holes in the catalyst coated membrane and the holes in the compression frames. A person skilled in the art would easily understand that the holes in the open pore meshes for allowing the penetration of the fasteners can have the same size as the holes in the CCM and/or as the holes in the compression frames.

A front view of another embodiment of the electrochemical cell according to the present invention is illustrated in FIG. 5. This embodiment is similar to the one illustrated in FIGS. 1 and 2 in regards to the overall relative arrangement of the CCM, open pore meshes and compression frames, but differs from the embodiment illustrated in FIGS. 1 and 2 in regards to the design of the compression frames including the number and the distribution of the compression arms and of their connection sites, the design of the open pore meshes, the number of holes in the open pore meshes and in the CCM through which fasteners protrude and the current conducting leads for each compression frame.

Electrochemical cell 300 comprises two compression frames 312 and 314 provided with compression arms (e.g. 307) and fasteners 322 which enable the required compression of the CCM 302 between the two open pore meshes (only one pore mesh being visible in the view illustrated in FIG. 5 as open pore mesh 308) and between the compression frames 312 and 314. Rivets are used as fasteners for ensuring the compression of this electrochemical fuel cell.

In this embodiment, each of the compression frames 312, 314 is provided with only one lead 330, and respectively 332 instead of the two leads 130, and respectively 131 illustrated in FIG. 1. Leads 330 and 332 for each compression frame of this alternative embodiment are preferably wider than each of the leads 130, 131 illustrated in FIG. 1.

Furthermore, each compression frame 312, and respectively 314 comprises a peripheral area 311 and respectively 313, each located on one side of the respective compression frame, and being provided with holes 343 and respectively 345. When the electrochemical cell is assembled, as illustrated in FIG. 5, the peripheral area 311 of frame 312 extends beyond the compression frame 314 and the peripheral area 313 of the compression frame 314 extends beyond the compression frame 312. Electrochemical cell 300 can be mounted in a reactor tank by sliding the peripheral areas of its compression frames in slots provided on two opposite walls of the reactor tank. When more than one electrochemical cell is mounted in a reactor tank, the slots in each of the two opposite walls of the reactor tank are positioned at a certain distance from each other to provide the spacing between the electrochemical cells in the stack. Holes 343 and respectively 345 in the peripheral areas of the compression frames allow the wastewater solution in the tank to circulate from one side of an electrochemical cell to the other side, such that the electrochemical cells are substantially surrounded by the wastewater solution in the tank. A person skilled in the art would easily understand that in some embodiments, only one hole in each of the peripheral areas of the compression frames of the electrochemical cell, dimensioned appropriately, is sufficient for achieving the desired effect. Furthermore, in some embodiments, each compression frame 312 and 314 can have a peripheral area on each of the two opposite sides of the frame and the holes in the peripheral areas of the compression frames allow the wastewater to reach from one side of the electrochemical cell to the other.

Figure 6:
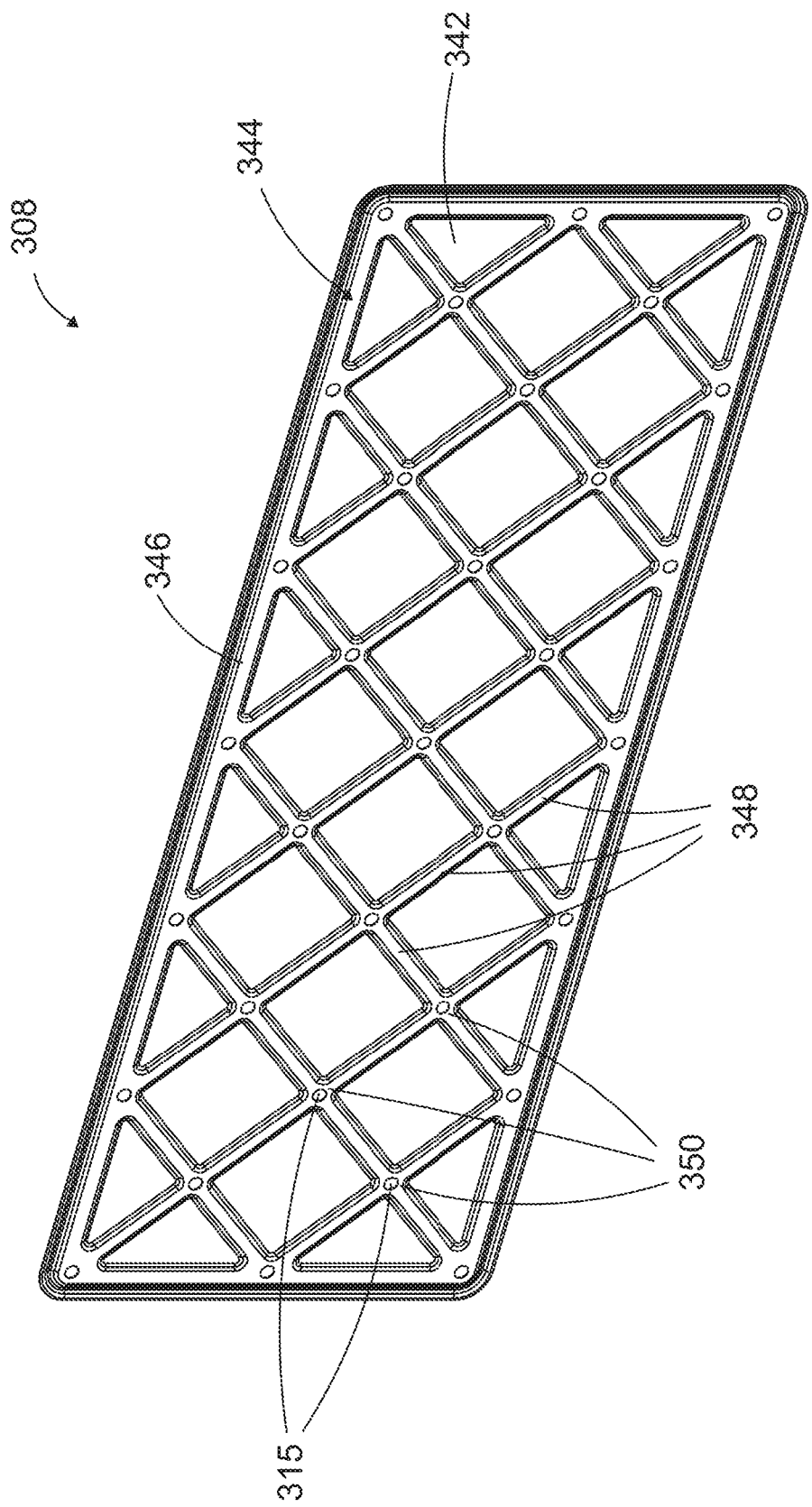
FIG. 6 illustrates an embossed open pore mesh according to the embodiment illustrated in FIG. 5.

The open pore mesh 308 shown as part of an electrochemical cell in FIG. 5 is illustrated in more detail in FIG. 6. Open pore mesh 308 comprises a flat surface 342 and an embossed surface 344. The embossed surface 344 comprises a peripheral embossed area 346 along the perimeter of the open pore mesh 308, transverse embossed areas 348 which, in the assembled electrochemical cell are placed next to the compression arms 307 of the compression frame 312, and embossed areas 350 which surround the holes 315 provided in the open pore mesh. The transverse embossed areas connect the embossed areas which surround holes 315 to each other and to the peripheral embossed area.

The embossed area 350 of the open pore mesh 308 around the holes 315 looks the same as the embossed areas 150, 160, 250 or 260 illustrated in FIG. 3 or 4, comprising a raised flat area and an inclined area. The difference between the open pore mesh 108 illustrated in FIG. 1 and the open pore mesh 308 illustrated in FIG. 6 is that the open pore mesh 308 also comprises transverse embossed areas 348 and the peripheral embossed area 346 along the perimeter of the open pore mesh. The peripheral embossed area 346 also comprises holes 315 for the penetration of fasteners as illustrated in FIG. 6.

A cross-section B-B through the area of the electrochemical cell 300 from FIG. 5 comprising transverse embossed areas of the open pore mesh that lie next to the compression arms of the compression frame, is shown in FIG. 7. The cross-section illustrates the transverse embossed areas 348 and respectively 368 which are placed next to the compression arms 307, 318 of the compression frames 312 and 314. CCM 302 is placed between two open pore meshes 308 and 310 which are placed between two compression frames 312 and 314. Each open pore mesh 308 and respectively 310 comprises a flat surface 342 and respectively 352, and a transverse embossed area 348 and respectively 368, each transverse embossed area comprising a raised flat area 354, and respectively 364 and an inclined area 356, and respectively 366 which surrounds the raised flat area of the transverse embossed area and connects it to the flat surface of the open pore mesh.

The peripheral embossed area 346 which is at the periphery of the open pore mesh 308 along its perimeter also comprises a raised flat area and an inclined area which are similar to the raised areas and inclined areas illustrated in FIG. 7 and a person skilled in the art would easily understand that the peripheral embossed area 346 comprises a raised flat area which stretches along the perimeter of the open pore mesh and which connects to the flat surface of the open pore mesh through an inclined area.

In some embodiments, each open pore mesh comprises only distinct embossed areas around the holes provided in the mesh and a peripheral embossed area, and in other embodiments each open pore mesh can comprise only distinct embossed areas around the holes provided in the mesh and transverse embossed areas which connect the distinct embossed areas around the holes. In all the embodiments, the peripheral embossed area also includes holes for the penetration of fasteners.

Figure 8:
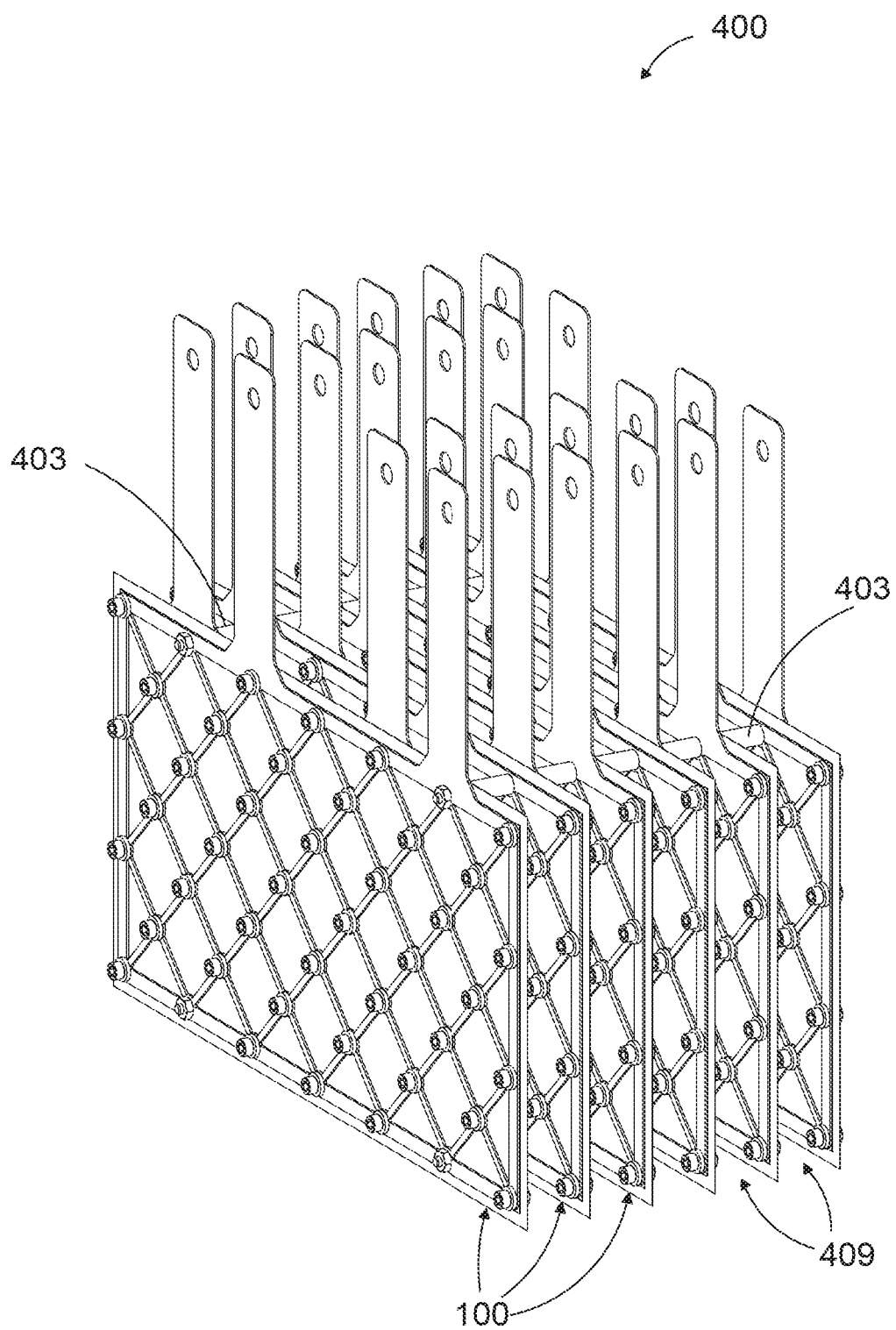
FIG. 8 illustrates a schematic of a stack of electrochemical cells having a construction according to the present invention.

A stack of electrochemical cells according to the first embodiment of the present invention illustrated in FIG. 1 is shown in FIG. 8. Stack 400 comprises a plurality of electrochemical cells 100 having the same configuration as the one illustrated in FIGS. 1 and 2 described above. The cells are connected to each other through at least one rod 403 which provides for the required spacing 409 between the individual cells 100. In the illustrated stack two rods were provided for positioning the electrochemical cells at the required spacing. The illustrated stack comprises 6 electrochemical cells, but a person skilled in the art would easily understand that a stack according to the present invention can comprise more electrochemical cells or, for some very small scale applications, less than 6 electrochemical cells. In preferred embodiments, one stack comprises 50 cells, but stacks can comprise up to about 500 individual electrochemical cells. When the electrochemical cells in the stack placed in the reactor tank have the configuration of the electrochemical cell 300 illustrated in FIG. 5, each of the electrochemical cells 300 making the stack would be placed in corresponding slots provided in the opposite walls of a reactor tank to provide the required spacing between the cells such that wastewater solution can flow through spacing between the cells and through the holes provided in the peripheral areas of the compression frames and each cell is substantially immersed in the wastewater solution in the reactor tank.

When assembled in a stack, the electrochemical cells can be arranged such that the anode side of one electrochemical cell is facing the cathode side of the neighbouring cell or such that the cathode side of one electrochemical cell is facing the cathode side of the neighbouring cell and the anode side of one electrochemical cell is facing the anode side of the neighbouring electrochemical cell.

Figure 9:
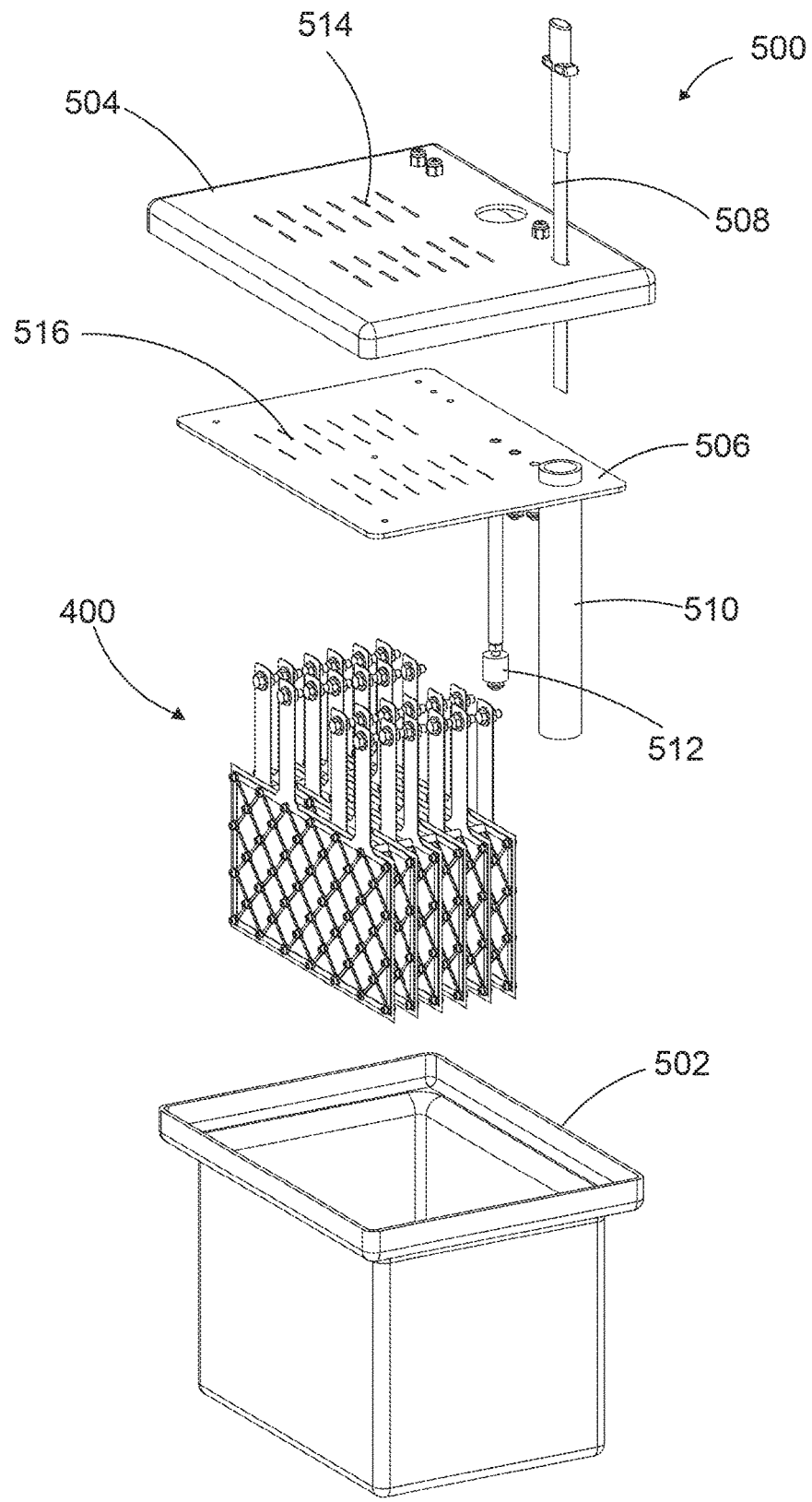
FIG. 9 illustrates an exploded view of a module for wastewater treatment comprising a reactor tank and a stack of electrochemical cells having a construction according to the present invention.

A module 500 for wastewater treatment comprises a stack 400 of electrochemical cells immersed in a reactor tank as illustrated in an exploded view in FIG. 9. Stack 400 which has a similar design as the one illustrated in FIG. 8, is contained within a reactor tank 502 such that the electrodes of each of the electrochemical cells in the stack are exposed directly to the wastewater and pollutants. Module 500 further comprises an outer lid 504 provided with feed ports (not illustrated) and gas venting ports 514 and an inner lid 506 which is also provided with feed ports (not illustrated) and gas venting ports 516, both inner and outer lids covering the reactor tank 502 at its upper part to contain the wastewater and stack 400 and to control the emissions from the module. Module 500 is also provided with a level sensor 508 to ensure that the stack operation is halted when the water level is below a desired threshold, which provides protection for the membrane and the electrode system from resistive burnout and non-uniform hydration. Within the reactor tank, level sensor 508 which is used for monitoring the water level within the reactor tank is housed within a tube 510. Module 500 is further provided with a level switch 512 for stopping the flow of wastewater into the reactor tank when the level in the tank reaches a predetermined level.

In a schematic review of the reactions taking place at the individual electrochemical cell level in a stack of electrochemical cells, having both the anode and the cathode directly exposed to wastewater, more specifically to wastewater containing ammonia, the electrochemical oxidation process on the anode falls into the categories of direct, indirect surface mediated, and indirect secondary oxidant mediated oxidation with the specific reactions dependent on the type of SPE used, the choice of catalyst, and the composition of the wastewater solution. A positive charge carrier is transferred using a cation SPE while a negative charge carrier is transferred using an anion SPE. On the anode side, polluted wastewater is exposed to the anode catalyst layer and a step-wise oxidation process takes place, which involves either direct, indirect surface mediated or indirect secondary oxidant mediated oxidation as shown in Equations 1 to 3 for a cation SPE and Equations 6 and 7 for an anion SPE, respectively.

For a cation SPE-based cell, where wastewater (for example wastewater with an ammonia pollutant) is exposed to the anode catalyst layer, a step-wise oxidation process takes place at the anode involving either a direct oxidation, as shown in Equation 1, or an indirect oxidation, as shown in Equations 2(a) and 2(b) or in Equations 3(a) and 3(b):

Equation 1: Direct oxidation of ammonia (anode half reaction):

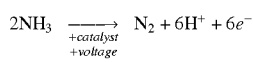

Equation 2: Indirect oxidation of ammonia (anode half reaction) via (a) production of hydroxyl surface species from water and (b) oxidation of ammonia via surface hydroxyl species:

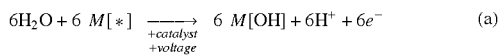

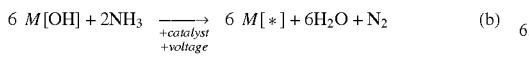

Equation 3: Indirect secondary oxidant mediated oxidation of ammonia (anode half reaction) via (a) production of hypochlorite species from NaCl and (b) indirect oxidation of ammonia via hypochlorite:

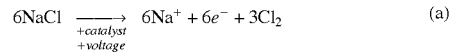

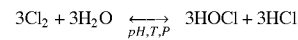

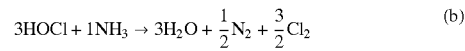

For a cation SPE-based electrochemical cell where the anode half reaction is illustrated in Equations 1 or 2, the cathode reaction involves the direct production of hydrogen from protons transported across the SPE, as illustrated in Equation 4:

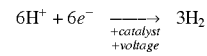

For a cation SPE-based electrochemical cell where the anode half reaction is illustrated in Equation 3, the cathode reaction involves the direct production of sodium hydroxide via the transport of sodium ions across the SPE, as illustrated in Equation 5(a). The sodium hydroxide then undergoes a subsequent reaction in solution with products of the anode reaction to reform the salt and water, as illustrated in Equation 5(b).

Equation 5:

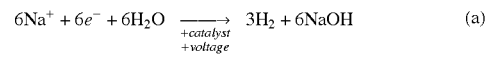

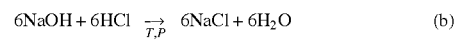

Alternatively, for an anion SPE-based electrochemical cell, where wastewater (in this case an ammonia pollutant) is exposed to the anode catalyst layer a step-wise indirect oxidation process takes place at the anode, involving either hydroxyl surface species or hypochlorite as shown in Equation 6 and Equation 7, respectively:

Equation 6: Indirect oxidation of ammonia (anode half reaction) via surface hydroxyl species:

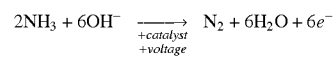

Equation 7: Indirect oxidation of ammonia (anode half reaction) via (a) production of hypochlorite species from Cl ions transported across the SPE and (b) indirect oxidation of ammonia via hypochlorite:

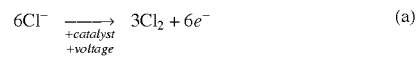

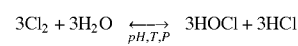

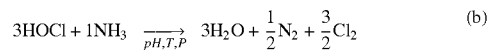

For an anion SPE-based electrochemical cell where the anode half reaction is illustrated in Equation 6, the cathode reaction involves the production of hydroxyl charge carriers and hydrogen from water, as illustrated in Equation 8:

$$6H_2O + 6e^- \xrightarrow[+voltage]{+catalyst} 6OH^- + 3H_2$$

For an anion SPE-based electrochemical cell where the anode half reaction is illustrated in Equation 7, the cathode reaction involves the production of chlorine ion charge carriers and hydrogen from NaCl and water, as illustrated in Equation 9:

$$6H_2O + 6NaCl + 6e^- \xrightarrow[+voltage]{+catalyst} 6NaOH + 3H_2 + 6Cl^-$$

The reactions shown in Equations 1 to 3 and, respectively in Equations 6 and 7 are anode half-reactions and, as a person skilled in the art would know, in many cases there could be numerous intermediate steps in the reactions and as result there could be many intermediate species. However such intermediate species are also oxidized to a final product which typically comprises $CO_2$ for carbon containing pollutants, $N_2$ for nitrogen-containing pollutants and $SO_x$ for sulphur containing pollutants.

At the cathode, pollutants can also be reduced when in contact with the cathode catalyst layer and such reduction reactions may also assist in the stepwise removal of the wastewater pollutants and their oxidation intermediate compounds formed at the anode.

As seen in the above reactions, gases are generated at both the anode and the cathode during the wastewater treatment and wastewaters that have a high concentration of pollutants can generate a substantial amount of gas. In the conventional wastewater treatment systems which use flow plates, the product gases generated during the electrochemical cell operation can accumulate in the flow field channels and therefore they block wastewater access to the catalyst reaction sites generating regions of electrode deactivation.

In the present invention the product gases generated at the anode and cathode can freely flow through the spaces 409 between the individual electrochemical cells, illustrated, for example, in FIG. 8, and they can accumulate in the headspace provided within the reactor tank 502 to be subsequently vented or captured. In some embodiments, the reactor tank can include a recirculation pump or a stirring mechanism or can use the product gases to help mix the wastewater within the tank.

A wastewater treatment system can comprise more than one module 500. The polluted wastewater is stored in a holding tank from where it is pumped to modules 500 where it is treated for removing the pollutants. If the system comprises more than one module 500, the stacks in modules 500 can be connected in series or in parallel, as illustrated for example in applicant's co-owned United States patent publication number 2015/0298998.

In the embodiments presented here electrochemical cells 100 and 300 comprise a catalyst coated membrane (CCM) 102 and respectively 302. In alternative embodiments, the anode and the cathode catalysts layers can be deposited for example on the sides of the open pore meshes which face the membrane when the electrochemical cell is assembled together. Furthermore, in other embodiments, the anode catalyst layer can be deposited on one side of the membrane and the cathode catalyst layer can be deposited on the side of the open pore mesh that is facing the other side of the membrane when the electrochemical cell is assembled together or the cathode catalyst layer can be deposited on one side of the membrane and the anode catalyst layer can be deposited on the side of the open pore mesh that is facing the other side of the membrane when the electrochemical cell is assembled together. In yet another embodiment, the membrane is a cation solid polymer electrolyte whereby the reactions illustrated in Equations 1, 2 or 3 can take place at the anode and the reactions illustrated in Equations 4 or 5 can take place at the cathode and in other embodiments the membrane can be a anion solid polymer electrolyte whereby the reactions illustrated in Equations 6 or 7 can take place at the anode and the reactions illustrated in Equations 8 or 9 can take place at the cathode.

The anode and, respectively the cathode active area of an electrochemical cell can be in the range from about 5 to 3,500 $cm^2$.

In all the embodiments, the anode and the cathode catalysts can comprise a variety of catalyst materials including but not limited to platinum, platinum-derived alloys comprising iridium, ruthenium, rhodium, palladium, cobalt, nickel, iron and iron alloys, copper and copper alloys, mixed metal oxides, diamond, and ceramic-derived catalysts. As known in the art, use of supported catalysts can improve the dispersion of the catalytic materials and thus utilization and also the interaction between certain catalysts and supports can enhance catalytic activity and durability. Examples of catalyst supports that could be used in combination with the list of catalyst materials in the present invention comprise titanium, niobium, nickel, iron, graphite, mixed metal oxides, and ceramics. Anode and cathode catalysts can also comprise stainless steel or graphite.

A method for operating the electrochemical cell of the present invention is also disclosed. The method comprises the steps of:

a. supplying a flow of polluted wastewater to a electrochemical cell, for example to electrochemical cell 100 illustrated in FIGS. 1 and 2 or to electrochemical cell 300 illustrated in FIG. 5 described above, whereby the electrochemical cell is immersed in a reactor tank similar to reactor tank 502 which contains the polluted wastewater and wastewater is supplied to both the anode and cathode sides of the electrochemical cell, b. providing a voltage across the electrochemical cell, and c. operating the electrochemical cell to a predetermined current density to thereby degrade the pollutant in the wastewater, wherein the wastewater flows between the compression arms of the compression frames and through the open pores of the open pore meshes to reach the catalyst layers and to thereby generate the reactions which degrade the pollutant in the wastewater.

Samples are taken from the wastewater contained in the reactor tank at predetermined times during the electrochemical cell stack operation and if the sampled water in the reactor tank meets the predetermined purity values the water is removed from the reactor tank into a discharge tank. The predetermined times for taking water samples from the reactor tank are based on the pollutant removal rates obtained for a particular wastewater composition, for example, during experimental tests, and also depend on the volume of wastewater to be treated. The supply and discharge of the wastewater and of the treated water to and respectively from the reactor tank can be done through a pumping system.

In preferred embodiments the operating voltage for a single electrochemical cell ranges between about 1.3 to about 10 V, and the operating current density is between about 0.05 and about 1.0 A/cm$^2$.

A method of assembling an electrochemical cell for wastewater treatment as the one described in relation to FIG. 1 or 5 is also provided and the method comprises the steps of:
- a. providing a solid polymer electrolyte membrane having an anode catalyst layer deposited on a first side of the solid polymer electrolyte membrane and a cathode catalyst layer deposited on a second side of the solid polymer electrolyte membrane, opposite to the first side;
- b. positioning a first open pore mesh adjacent to the anode catalyst layer and a second open pore mesh adjacent to the cathode catalyst layer, wherein each of the first open pore mesh and the second open pore mesh comprises a flat surface and an embossed surface which is raised from the flat surface;
- c. positioning a first compression frame, adjacent to the first open pore mesh and a second compression frame, adjacent to the second open pore mesh, each of the compression frames having compression arms connected to each other at connection sites and being spread within the area delimited by the perimeter of the frame;
- d. inserting fasteners through holes provided in the compression arms of the first and second compression frames at the connection sites, through holes provided in the first and second open pore meshes and through the solid polymer electrolyte membrane and the anode and cathode catalyst layers, and
- e. compressing the solid polymer membrane, the first open pore mesh, the second open pore mesh, the first compression frame and the second compression frame at the connection sites through a compression force provided by the fasteners, wherein the connection sites are distributed within the area delimited by the perimeter of the frame to provide a substantially uniform compression force over an area of the electrochemical cell delimited by the compression frames.

The advantages of the present electrochemical cell for wastewater treatment and the method of operating it are numerous compared to the solutions from the prior art. Because the electrochemical cell does not comprise any flow field plates and allows easier access of the wastewater to and from the catalyst reaction sites and the flow of product gases through the individual cells towards the top of the reactor tank, electrode deactivation due to gas accumulation is substantially reduced which increases the concentration of pollutants at the surface of the catalyst layer and therefore allows a higher electrical system efficiency with higher pollutant removal rates and eliminates the need for high pressure pumping. Furthermore, an advantage of the present electrochemical cell is that the risk of electrical short-circuit caused by the accidental connection between the conductive components of the electrochemical cell is prevented.

Table 1 below summarizes the performance of an electrochemical cell of the present invention for treating wastewater to remove different types of pollutants.

TABLE 1

| Description | Units | Formaldehyde | Ammonia | Methanol | EG |
|---|---|---|---|---|---|
| Catalyst type | — | PGM | PGM | PGM | PGM |
| Concentration | mg/L | 10,000 | 6,400 | 50,000 | 10,000 |
| Treatment objective | % | 65 | 70 | 70 | 70 |
| Continuous Run Time | Hours | 1,200 | 380 | 500 | 120 |
| Average Removal Rate | mg/m$^2$ hr | 123,000 | 58,000 | 415,000 | 98,000 |
| Energy Consumption | kWh/m$^3$ | 71 | 37 | 470 | 175 |

Notes:
PGM stands for platinum group metal catalyst;
EG stands for Ethylene Glycol.
By comparison, average pollutant removal rates for electrochemical cells using conventional flow field plates is about 6,000 mg/m$^2$ hr for ammonia and 200,000 mg/m$^2$ hr for methanol.

Since the conventional compression hardware at the periphery of the electrochemical cell has been replaced by the compression frames of the present invention with compression arms and connection sites distributed over the entire anode and respectively cathode active area of the electrochemical cell, a substantially uniform compression is achieved which allows a consistent reduced electrode gap of between about 25 to about 50 microns and a high surface area of the catalyst layer in contact with the solid polymer electrolyte which leads to a high electrical efficiency of this architecture which can also be scaled up to larger electrochemical cells that can operate at variable effluent flow rates of between several milliliters to thousands of liters.

Since the electrical isolation is done by the portion of the SPE membrane that extends beyond the active area of the catalyst layers, no additional isolation layer between the compression frames is required which eliminates the previous failure modes due to the incompatibility of the isolation layer material with the wastewater being treated.

Overall the present system has a low operating cost due to the removal of the flow field plates and of the gas diffusion layers, low energy consumption, lower voltage operation to achieve same level of pollutant removal and can operate at variable effluent flow rates.

The disclosure of U.S. provisional patent application Ser. No. 62/487,827 filed Apr. 20, 2017, is incorporated herein in its entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. An electrochemical cell for wastewater treatment comprising:
- a. a solid polymer electrolyte membrane;
- b. an anode catalyst layer adjacent to a first side of the solid polymer electrolyte membrane and a cathode catalyst layer adjacent to a second side of the solid polymer electrolyte membrane, opposite to the first side;
- c. a first open pore mesh adjacent to the anode catalyst layer and a second open pore mesh adjacent to the cathode catalyst layer;

d. a first compression frame, adjacent to the first open pore mesh and a second compression frame, adjacent to the second open pore mesh, each of the compression frames having compression arms spread within the area delimited by the perimeter of the frame, the compression arms being connected to each other at connection sites;

e. fasteners which protrude through holes provided in the compression arms of the first and second compression frames at the connection sites, through holes provided in the first and second open pore meshes and through the solid polymer electrolyte membrane and the anode and cathode catalyst layers, wherein the fasteners provide the force to compress the solid polymer electrolyte membrane, the catalyst layers and the open pore meshes between the two compression frames, wherein each of the first open pore mesh and the second open pore mesh comprises a flat surface and an embossed surface which is raised from the flat surface, and wherein each embossed surface of the first open pore mesh and of the second open pore mesh comprises embossed areas, each embossed area surrounding a hole provided in the open pore mesh.

2. The electrochemical cell of claim 1 wherein the embossed area surrounding a hole in the open pore mesh comprises a raised flat area and an inclined area which connects the raised flat area to the flat surface of the open pore mesh.

3. The electrochemical cell of claim 2 further comprising a spacer placed between the embossed area which surrounds a hole in the first open pore mesh and the anode catalyst layer and/or a spacer placed between the embossed area that surrounds a hole in the second open pore mesh and the cathode catalyst layer.

4. The electrochemical cell of claim 1 wherein each embossed surface of the first open pore mesh and of the second open pore mesh further comprises transverse embossed areas, each transverse embossed area connecting two embossed areas which each surround a hole and being placed next to the compression arms in the assembled electrochemical cell.

5. The electrochemical cell of claim 4 wherein each transverse embossed area of the open pore mesh comprises a raised flat area and an inclined area which connects the raised flat area to the flat surface of the open pore mesh.

6. The electrochemical cell of claim 1 or 4 wherein each embossed surface of the first open pore mesh and of the second open pore mesh further comprises a peripheral embossed area that is placed at the periphery of the open pore mesh along the perimeter thereof, the peripheral embossed area comprising a raised flat area and an inclined area which connects the raised flat area to the flat surface of the open pore mesh.

7. An electrochemical cell for wastewater treatment comprising:

a. a solid polymer electrolyte membrane;

b. an anode catalyst layer adjacent to a first side of the solid polymer electrolyte membrane and a cathode catalyst layer adjacent to a second side of the solid polymer electrolyte membrane, opposite to the first side;

c. a first open pore mesh adjacent to the anode catalyst layer and a second open pore mesh adjacent to the cathode catalyst layer;

d. a first compression frame, adjacent to the first open pore mesh and a second compression frame, adjacent to the second open pore mesh, each of the compression frames having compression arms spread within the area delimited by the perimeter of the frame, the compression arms being connected to each other at connection sites;

e. fasteners which protrude through holes provided in the compression arms of the first and second compression frames at the connection sites, through holes provided in the first and second open pore meshes and through the solid polymer electrolyte membrane and the anode and cathode catalyst layers, wherein the fasteners provide the force to compress the solid polymer electrolyte membrane, the catalyst layers and the open pore meshes between the two compression frames, wherein each of the first open pore mesh and the second open pore mesh comprises a flat surface and an embossed surface which is raised from the flat surface, wherein the solid polymer electrolyte membrane is provided with holes to allow the penetration of the fasteners, and wherein the holes in the open pore meshes are bigger than the holes in the solid polymer membrane and/or the holes in the compression arms.

8. An electrochemical cell for wastewater treatment comprising:

a. a solid polymer electrolyte membrane;

b. an anode catalyst layer adjacent to a first side of the solid polymer electrolyte membrane and a cathode catalyst layer adjacent to a second side of the solid polymer electrolyte membrane, opposite to the first side;

c. a first open pore mesh adjacent to the anode catalyst layer and a second open pore mesh adjacent to the cathode catalyst layer;

d. a first compression frame, adjacent to the first open pore mesh and a second compression frame, adjacent to the second open pore mesh, each of the compression frames having compression arms spread within the area delimited by the perimeter of the frame, the compression arms being connected to each other at connection sites;

e. fasteners which protrude through holes provided in the compression arms of the first and second compression frames at the connection sites, through holes provided in the first and second open pore meshes and through the solid polymer electrolyte membrane and the anode and cathode catalyst layers, wherein the fasteners provide the force to compress the solid polymer electrolyte membrane, the catalyst layers and the open pore meshes between the two compression frames, wherein each of the first open pore mesh and the second open pore mesh comprises a flat surface and an embossed surface which is raised from the flat surface, and wherein the embossed surface is dimensioned based on the elasticity of the material of the first and second open pore meshes, on a compression force applied by the fasteners to the assembly and on the thickness of the first and second open pore meshes.

9. An electrochemical cell for wastewater treatment comprising:

a. a solid polymer electrolyte membrane;

b. an anode catalyst layer adjacent to a first side of the solid polymer electrolyte membrane and a cathode catalyst layer adjacent to a second side of the solid polymer electrolyte membrane, opposite to the first side;

c. a first open pore mesh adjacent to the anode catalyst layer and a second open pore mesh adjacent to the cathode catalyst layer;

d. a first compression frame, adjacent to the first open pore mesh and a second compression frame, adjacent to the second open pore mesh, each of the compression frames having compression arms spread within the area delimited by the perimeter of the frame, the compression arms being connected to each other at connection sites;

e. fasteners which protrude through holes provided in the compression arms of the first and second compression frames at the connection sites, through holes provided in the first and second open pore meshes and through the solid polymer electrolyte membrane and the anode and cathode catalyst layers, wherein the fasteners provide the force to compress the solid polymer electrolyte membrane, the catalyst layers and the open pore meshes between the two compression frames, wherein each of the first open pore mesh and the second open pore mesh comprises a flat surface and an embossed surface which is raised from the flat surface, and wherein the first compression frame comprises a first peripheral area on one side of the frame and the second compression frame comprises a second peripheral area on one side of the frame, each peripheral area being provided with at least one hole and wherein, in the assembled electrochemical cell, the first peripheral area extends in an opposite direction from the second peripheral area, and each peripheral area extends beyond the opposing compression frame.

10. The electrochemical cell of claim 3 wherein the spacer(s) is/are made of rubber.

11. The electrochemical cell of claim 1 wherein the anode catalyst layer is deposited on one side of the solid polymer electrolyte membrane and the cathode catalyst layer is deposited on the opposite side of the solid polymer electrolyte membrane.

12. The electrochemical cell of claim 1 wherein the anode catalyst layer is deposited on the first side of the solid polymer electrolyte membrane and the cathode catalyst layer is deposited on a side of the second open pore mesh facing the second side of the solid polymer electrolyte membrane.

13. The electrochemical cell of claim 1 wherein the cathode catalyst layer is deposited on the second side of the solid polymer electrolyte membrane and the anode catalyst layer is deposited on a side of the first open pore mesh facing the first side of the solid polymer electrolyte membrane.

14. The electrochemical cell of claim 1 wherein the anode catalyst layer is deposited on a side of the first open pore mesh facing the first side of the solid polymer membrane and the cathode catalyst layer is deposited on a side of the second open pore mesh facing the second side of the solid polymer membrane.

15. The electrochemical cell of claim 1 wherein the solid polymer electrolyte membrane has a peripheral portion that extends beyond the catalyst layers and protrudes between the first and the second compression frame to provide electrical isolation between the two frames.

16. The electrochemical cell of claim 1 wherein the fasteners are made of non-conductive materials.

17. The electrochemical cell of claim 1 wherein the compression frames are made of conductive materials.

18. The electrochemical cell of claim 1 wherein the open pore meshes are made of conductive materials.

19. The electrochemical cell of claim 18 wherein the open pore meshes are made of metallic or ceramic materials.

20. The electrochemical cell of claim 1 wherein the solid polymer electrolyte membrane is an anion solid polymer electrolyte.

21. The electrochemical cell of claim 1 wherein the solid polymer electrolyte membrane is a cation solid polymer electrolyte.

22. A stack of electrochemical cells for wastewater treatment comprising at least one electrochemical cell of claim 1.

23. The stack of claim 22 wherein the electrochemical cells are connected through at least one rod and are positioned to create a space between two neighboring electrochemical cells, the space allowing the flow of product gases between the electrochemical cells.

24. The stack of claim 22 wherein an anode side of one electrochemical cell is facing an anode side of a neighboring electrochemical cell in the stack.

25. The stack of claim 22 wherein an anode side of one electrochemical cell is facing a cathode side of a neighboring electrochemical cell in the stack.

26. A system for the treatment of wastewater comprising at least one stack of electrochemical cells of claim 22 immersed in a reactor tank which contains the wastewater to be treated.

27. A system for the treatment of wastewater comprising at least one stack of electrochemical cells, each stack comprising at least one electrochemical cell of claim 9 immersed in a reactor tank wherein the peripheral areas of the compression frames of an electrochemical cell in the stack are located in slots provided in opposite walls of the reactor tank to position the electrochemical cell at a predetermined distance from the electrochemical cells which are placed next to it on either side, to thereby create a space between the neighbouring electrochemical cells, the space allowing the flow of product gases between the electrochemical cells.

28. A method for treating wastewater comprising the steps of:
a. providing at least one electrochemical cell of claim 1 which is immersed in a reactor tank which contains the wastewater to be treated,
b. providing a voltage across the electrochemical cell, and
c. operating the electrochemical cell at a predetermined current density to thereby degrade the pollutant in the wastewater, wherein wastewater flows between the compression arms of the compression frames and through the open pore meshes to reach the catalyst layers and to generate the reactions which degrade the pollutant in the wastewater.

29. The method of claim 28 comprising providing a voltage of about 1.3 to about 10 V across the electrochemical cell.

30. The method of claim 28 comprising operating the electrochemical cell at an operating current density of between about 0.05 to about 1.0 A/cm$^2$.

31. A method of assembling an electrochemical cell for wastewater treatment of claim 1 comprising the steps of:
a. providing a solid polymer electrolyte membrane, an anode catalyst layer adjacent to a first side of the solid polymer electrolyte membrane and a cathode catalyst layer adjacent to a second side of the solid polymer electrolyte membrane, opposite to the first side;
b. positioning a first open pore mesh adjacent to the anode catalyst layer and a second open pore mesh adjacent to the cathode catalyst layer, wherein the first open pore mesh and the second open pore mesh each comprise a flat surface and an embossed surface which is raised from the flat surface;
c. positioning a first compression frame, adjacent to the first open pore mesh and a second compression frame, adjacent to the second open pore mesh, each of the compression frames having compression arms connected to each other at connection sites and being spread within the area delimited by the perimeter of the frame;

d. inserting fasteners through holes provided in the compression arms of the first and second compression frames at the connection sites, through holes provided in the first and second open pore meshes and through the solid polymer electrolyte membrane and the anode and cathode catalyst layers, and e. compressing the solid polymer membrane, the first open pore mesh, the second open pore mesh between the first compression frame and the second compression frame at the connection sites through a compression force provided by the fasteners, wherein the connection sites are distributed within the area delimited by the perimeter of the frame to provide a substantially uniform compression force over an area of the electrochemical cell delimited by the compression frames.

\* \* \* \* \*